J. W. WILSON.
ANIMAL-TRAP.

No. 180,977. Patented Aug. 8, 1876.

WITNESSES:
Francis McArdle,
John Goethals

INVENTOR:
J. W. Wilson
BY
ATTORNEYS.

UNITED STATES PATENT OFFICE.

JACOB W. WILSON, OF SUMMERFORD, OHIO.

IMPROVEMENT IN ANIMAL-TRAPS.

Specification forming part of Letters Patent No. 180,977, dated August 8, 1876; application filed July 11, 1876.

*To all whom it may concern:*

Figure 1:
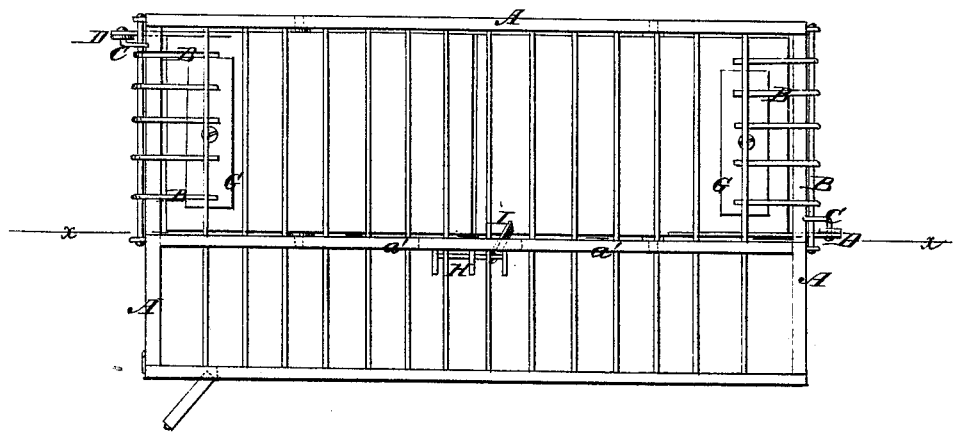
Figure 2:
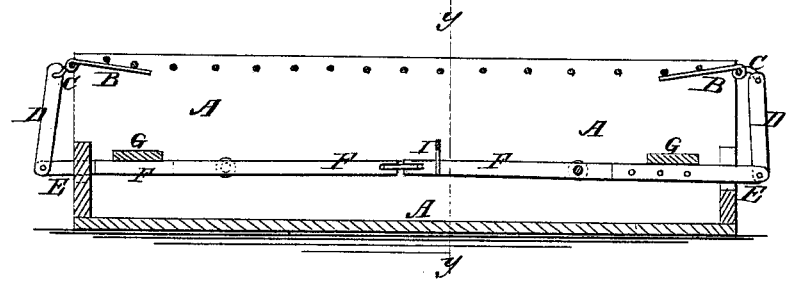
Figure 3:
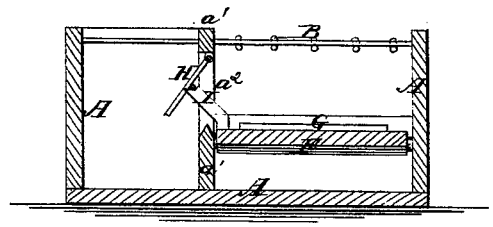

Be it known that I, JACOB W. WILSON, of Summerford, in the county of Madison and State of Ohio, have invented a new and useful Improvement in Self-Setting Animal-Trap, of which the following is a specification:

Figure 1 is a top view of my improved trap. Fig. 2 is a longitudinal section of the same, taken through the line $x\, x$, Fig. 1. Fig. 3 is a cross-section of the same, taken through the line $y\, y$, Fig. 2.

Similar letters of reference indicate corresponding parts.

The object of this invention is to furnish an improved animal-trap which shall be so constructed as to close when the animal enters the first compartment, to prevent his escape, and set itself when the animal enters the second compartment or cage.

The invention consists in an improved animal-trap formed by the combination of the swinging gates, the cranks, the connecting-rods, the weighted platforms, and the bent arm, with the box of the trap and with the gate hung in the opening through the partition of said box, as hereinafter fully described.

A is the box of the trap, the top of which is formed of bars to allow the light to pass in freely, and which is divided into two compartments by a longitudinal partition, $a$. The first compartment is made with open ends, which openings are closed by gates B, the ends of the top bar of which work in bearings attached to the box A. To the ends of the pivoting top bar of the gates B are attached short cranks $c$, to which are pivoted the upper ends of short connecting-bars D, the lower ends of which are pivoted to the projecting ends of short arms E. The arms E are rigidly attached to the outer parts of the side edges of the platforms F, which are pivoted at the middle parts of their side edges to the box A, and the inner ends of which meet, and are connected together by links or other flexible connections, forming a false bottom. To the outer parts of the platforms F are attached weights G, to make the outer ends of said platforms heavier than the inner ends. In the middle parts of the partition $a^1$ is formed an opening, $a^2$, in the upper part of which is pivoted the upper end of a gate, H, which swings into the second compartment of the trap. To the inner part of the inner edge of one of the platforms F is attached a short arm, I, which is bent so that its upper end may project through the opening $a^2$.

With this construction, when the trap is left free the weighted outer ends of the two platforms F will hold the gates B open, as shown in Figs. 1 and 2, leaving the first compartment open at both ends. As an animal enters and walks to the inner parts of the platforms F his weight overbalances the outer ends of said platform, and presses down their inner ends. This closes the gates B and draws down the arm I, so that the cross-bar of the gate H may swing in above the said arm I, locking the platforms F and the gates B in place, so that the said gates B cannot be opened by the animal running to the outer ends of said platforms F. When the animal finds he cannot get out at the ends of the trap, he tries the opening $a^2$, raises the gate H, and passes into the second compartment, and is securely caged. The opening of the gate H releases the arm I, and allows the platforms F to return to their places, resetting the trap.

Having thus described my invention, I claim as new, and desire to secure by Letters Patent—

The improved animal-trap formed by the combination of the swinging gates B, the crank C, the connecting-rods D, the weighted platform F, and the bent arm I, with the box A $a^1$ of the trap, and with the gate H, hung in the opening $a^2$ through the partition $a^1$ of said box, substantially as herein shown and described.

JACOB W. WILSON.

Witnesses:
  S. F. SAUNDERS,
  D. TURPIN.